Feb. 27, 1923.
A. P. LEE
STEERING MECHANISM
Filed June 23, 1919

Witnesses:
W. F. Kilroy
Harry R. L. White

Inventor:
Albert P. Lee
By Gebel & Mueller
Attys.

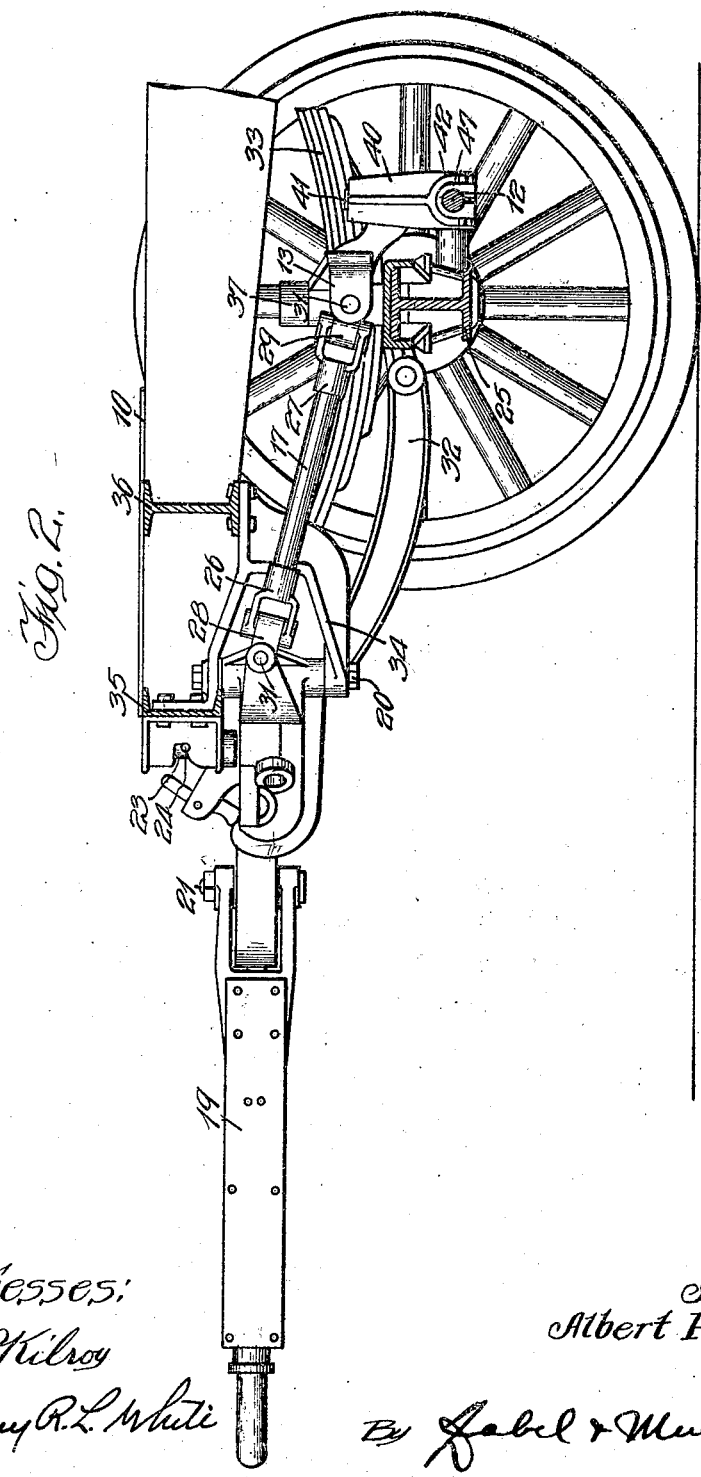

Feb. 27, 1923.
A. P. LEE
STEERING MECHANISM
Filed June 23, 1919
1,446,756
4 sheets-sheet 3
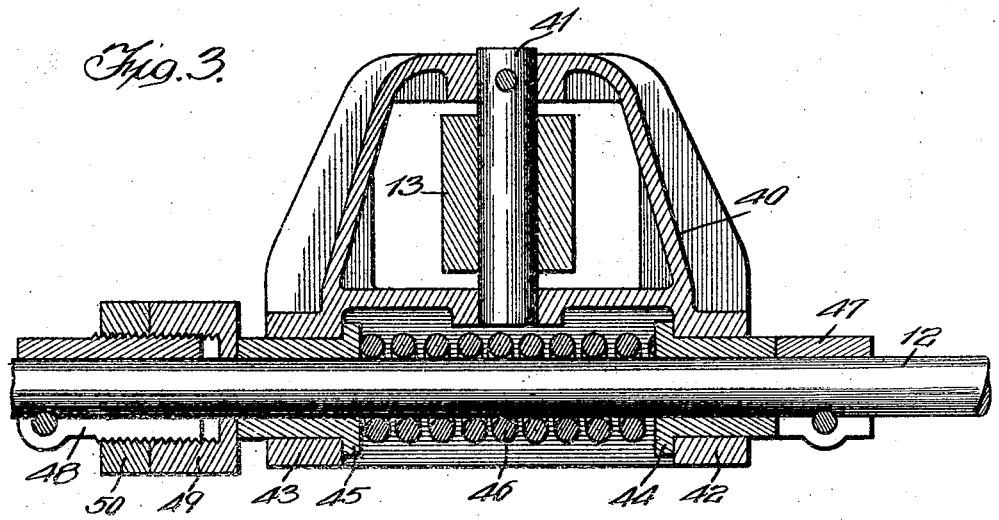
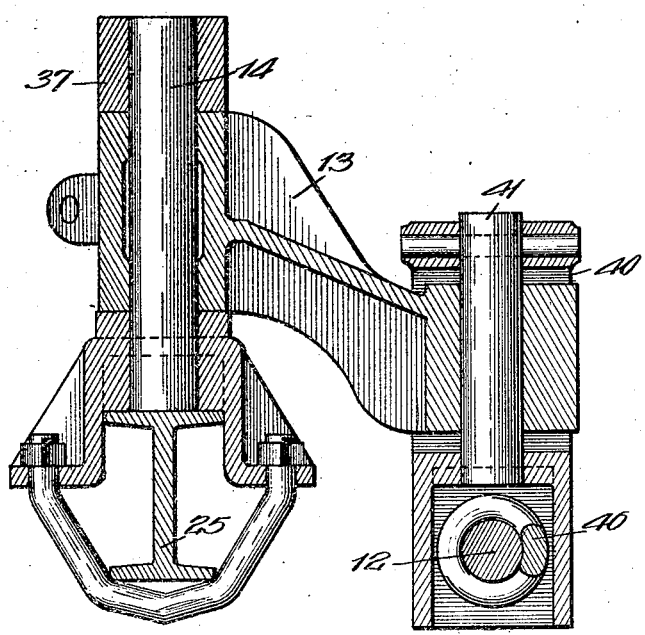

Feb. 27, 1923.
A. P. LEE
1,446,756
STEERING MECHANISM
Filed June 23, 1919
4 sheets-sheet 4
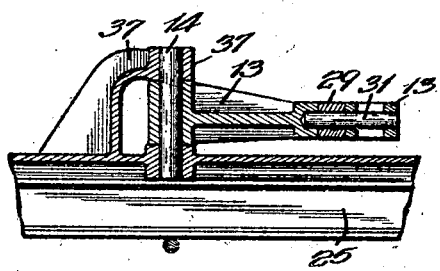
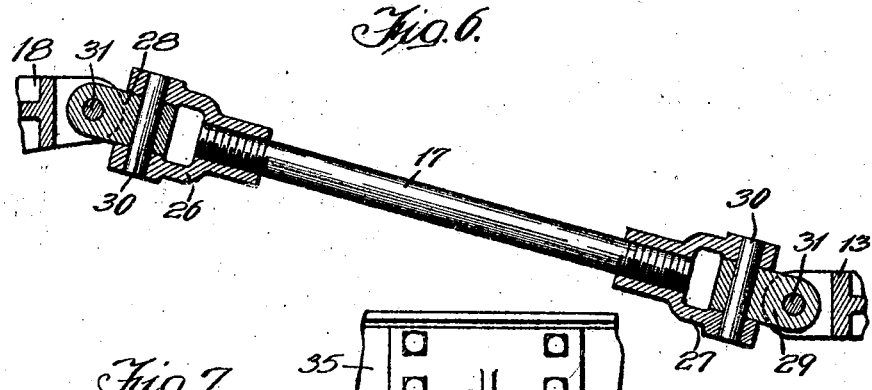
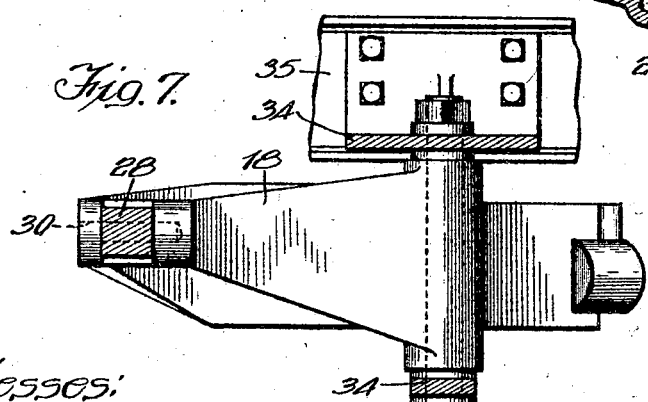
Witnesses:
W. F. Kilroy
Harry White
Inventor:
Albert P. Lee Patented Feb. 27, 1923.

1,446,756

UNITED STATES PATENT OFFICE.

ALBERT P. LEE, OF CHICAGO, ILLINOIS, ASSIGNOR TO LEE TRAILER & BODY CO., OF CHICAGO, ILLINOIS.

STEERING MECHANISM.

Application filed June 23, 1919. Serial No. 306,202.

*To all whom it may concern:*

Be it known that I, ALBERT P. LEE, a citizen of the United States, residing at Chicago, in the county of Cook and State of Illinois, have invented a certain new and useful Improvement in Steering Mechanism, of which the following is a full, clear, concise, and exact description, reference being had to the accompanying drawings, forming a part of this specification.

My invention relates to steering mechanisms for trailers and has for its object the provision of improved means of this character so arranged that the steering mechanism is uninfluenced throughout its range of operations by any relative motion there may be between the wheels and the framework of the vehicle due to the interposition of springs between them.

My invention further contemplates the provision of suitable resilient means interposed in a portion of the steering mechanism whereby to relieve the steering mechanism of sudden jars due to sudden movements of one or both wheels due to meeting obstructions of a character which tend momentarily to throw the wheel or wheels out of their given position.

In trailer construction it has been the custom to use the standard ball and socket drag links for connecting up the steering mechanism. In fact, practically the same type of drag link is used on motor trucks or even on touring cars. Both axles of a four wheel reversible trailer are practically the same as the front axle of a motor truck, it of course being understood that each carries only half of the load, whereas the motor truck rear axle carries from sixty to ninety per cent of the load. The drag link system of a trailer should, therefore, be equivalent to the radius rod system of the rear axle of a motor truck, and this of course cannot be accomplished by ball and socket drag links.

On account of trailer axles being what are known as pivot axles or steering axles, it is desired and seems necessary to have some spring connection in the steering apparatus to provide against severe shocks. In the old style of connections, such as the ball and socket drag links, they have simply depended upon the small springs in the drag links on the socket to provide against shocks. These springs are very small and were never intended to take up such severe shocks as are transmitted to a heavy trailer axle. Furthermore, instead of a man with a steering wheel always ready to straighten up the axle, we have the positive action of the rear of the truck with its tremendous power, tending to emphasize the disalignment of the front wheels and to cause weaving of the steering wheels.

To provide against this I have done away with what is known as the rear drag link or the direct connection between the steering attachment of the axle and the steering mechanism. I have employed a tie rod running from the one stub axle steering arm to the other and have applied a suitable sliding connection on this tie rod, controlled by a spring of great strength. This strong spring holds the wheels in perfect alinement except when there is a very severe shock and of course is strong enough to bring the wheels back quickly into alinement after they have been moved by any obstruction.

In order to further provide greater strength of the steering mechanism I have employed a universal drag link connection between my steering arm and the steering head comprising yoke ends instead of ball and socket ends, thereby providing the strongest means known for connections of this nature.

Also for making it easy and practical to adjust this steering mechanism I have provided a left hand thread in one of the yokes and a right hand thread in the other, it not being necessary to take out any pins or in any way disengage the steering mechanism to bring the wheels into perfect alinement.

I will explain my invention more in detail by referring to the accompanying drawings illustrating one form in which Fig. 1 is a top view of a front portion of a trailer, the steering portion being constructed in accordance with my invention;

Fig. 2 is a sectional view on line 2—2 of Fig. 1;

Fig. 3 is a sectional view on line 3—3 of Fig. 1;

Fig. 4 is a sectional view on line 4—4 of Fig. 1;

Fig. 5 is a sectional view on line 5—5 of Fig. 1;

Fig. 6 is a sectional view on line 6—6 of Fig. 1; and

Fig. 7 is a sectional view on line 7—7 of Fig. 1.

Figure 1:
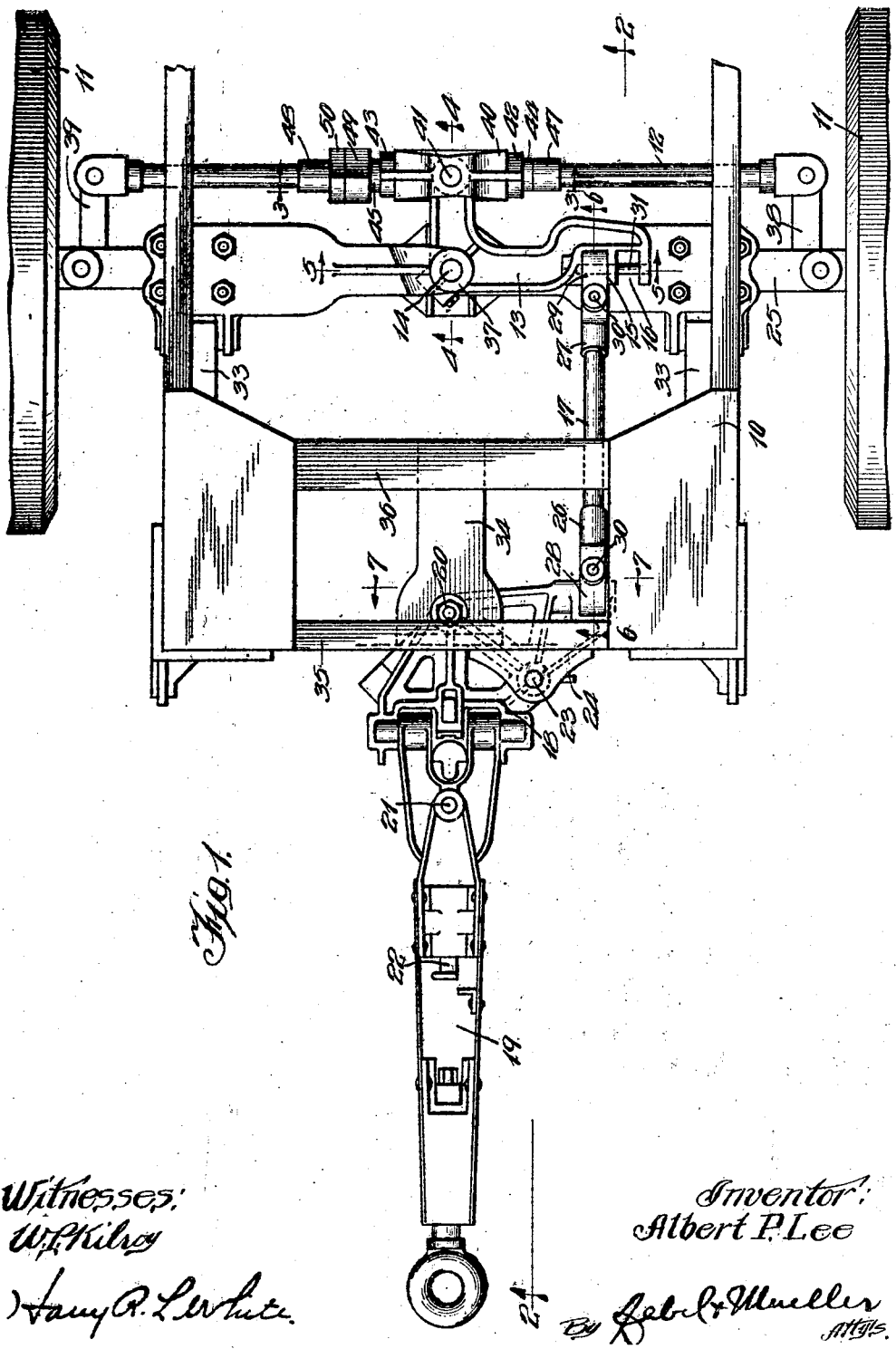

My improved structure comprises the trailer framework 10 having the wheels 11, 11. The wheels are suitably mounted so that they may be steered through the agency of the tie rod 12. This tie rod is associated with the bell crank lever 13, the said lever being pivotally mounted upon the stud 14. The bell crank lever has a pair of sockets 15 and 16, either one of which may be in association with the link 17, which link connects the bell crank lever 13 with the draw bar head 18. The draw bar head together with the draw bar 19 are of a design similar to that shown in my co-pending application Serial No. 289,490, filed April 12, 1919, and the draw bar head 18 is pivotally mounted upon the axis 20. The arrangement is such in accordance with my said co-pending application that the draw bar 19 is pivotally associated with the draw bar head 18 through the agency of the bolt 21. A suitable lock 22 is provided so that the draw bar may be locked to the draw bar head to prevent at times relative pivotal movement between the draw bar 19 and the draw bar head 18. The draw bar head 18 is pivotally mounted, as stated, upon the axis 20 so that it may swing in response to the swinging movement of the draw bar 19 whenever the draw bar is locked to the said draw bar head. A suitable bolt 23 is provided so that the draw bar head 18 may be locked to the framework of the trailer at times so as to lock the wheels 11 in the position shown in Fig. 1. At these times it is usually desirable to have the draw bar 19 pivotally associated with the draw bar head 18 for backing purposes. A suitable handle 24 controls the position of the bolt 23. The connection between the link 17 and the draw bar head and also the connection of this link with the bell crank lever 13 is of a universal character so that slight differences in position between the framework 10 and the axle 25 will not influence the relative positions of the steering mechanism parts.

The manner of obtaining the universal connection is more clearly shown in Fig. 6 where the link 17 is shown as mounted at its extremities in heads 26 and 27 respectively. The lugs 28 and 29 are provided, these lugs being pivotally carried in the heads 26 and 27 respectively through the agency of the pins 30. The lugs 28 and 29 are also pivotally connected to the draw bar head 18 and bell crank lever 13 through the agency of pins 31. Universal joints are thus provided for the link 17 at its opposite extremities where it engages the draw bar head and the bell crank lever 13.

It will be noted by an inspection of Fig. 2 that a radius rod 32 is provided which unites the framework with the front axle and the center points of the pivots of the link 17 and of the pivots of the radius rod 32 are approximately such distances apart that the up and down movement of the frame relative to the front axle will not cause any disturbance in the arrangement of the parts of the steering mechanism due to this up and down movement of the framework 10 due to the interposition of the trailer springs 33.

It will further be noted that the bell crank lever 13 has two sockets 15 and 16 so that the link may occupy either of two given positions depending upon the length of the draw bar head associated with said link and depending upon the curvature desired.

The bolt 20 is suitably held in a U-shaped framework 34 fixedly secured to the channel 35 and the eye beam 36, which channel and eye beam both form parts of the trailer. In this manner an exceedingly rigid and stable connection is secured for the said bolt which supports the draw bar head. The bell crank lever 13 is likewise held in a U-shaped framework 37 suitably secured to the front axle.

By referring more particularly to Figs. 3 and 4, the structure of the tie rod 12 will be more readily apparent. This tie rod extends preferably as one piece between the steering arms 38 and 39 and is controlled in this position by the block 40. This block 40 is pivotally associated with the bell crank lever 13 through the agency of the pin 41. The block 40 has sockets 42 and 43 which slidably receive bushings 44 and 45 respectively, which bushings are held in their position against the inner walls of the block by a very strong spring 46. A collar 47 is pinned to the rod 12 and defines the position of the rod relatively to the bushing 44. A collar 48 is also pinned to the rod 12 and an adjustable sleeve 49 suitably provided with a lock nut 50 is adjustably carried by the collar 48 so as to impinge against the bushing 45. There is thus a resilient means interposed between the bell crank lever 13 and the rod 12 and slight fluctuations of the wheels 11 due to obstructions in the road will not be received as jars by the steering mechanism, but will be taken up by the spring 46. This spring is strong enough so that there is no appreciable yielding in the steering mechanism under ordinary conditions of travel. It will be noted that the arrangement is such that the rod 12 may be displaced relatively to the block 40 in either direction, that is, either to the right or to the left (Fig. 3), depending upon the direction of displacement of the wheels 11 due to the obstructions as stated.

I claim:

1. A vehicle of the character described comprising a framework, a pair of wheels, a rigid tie rod connecting said wheels, a steering lever pivotally and slidably carried on said tie rod, and an adjustable resilient means interposed between said steering lever and said tie rod, said resilient means being of such strength as to be normally uncompressed when said steering mechanism is operated through said steering lever, but being yielding to such an extent as to cushion the sudden movement of said tie rod due to road shocks, said tie rod being provided with stops to limit the movement of said lever relative to said tie rod.

2. A vehicle of the character described comprising a framework, a pair of wheels, a rigid tie rod connecting said wheels, a yoke-like member slidably mounted on said rod, a steering lever pivotally mounted on said yoke, and a spring mounted on said rod between the arms of said yoke whereby said tie rod has a limited cushioned sidewise play relatively to said steering lever.

3. A vehicle of the character described comprising a framework, a pair of wheels, a rigid tie rod connecting said wheels, a yoke-like member slidably mounted on said rod, a steering lever pivotally mounted on said yoke, and a spring mounted on said rod between the arms of said yoke, said tie rod being provided with stops at both sides of said yoke whereby said tie rod has a limited cushioned sidewise play relatively to said steering lever.

4. A vehicle of the character described comprising a framework, a pair of wheels, a rigid tie rod connecting said wheels, a yoke-like member slidably mounted on said rod, a steering lever pivotally mounted on said yoke, a pair of headed sleeves mounted on said rod and extending through said yoke with the heads thereof in engagement with the inner faces of the arms of said yoke, and a spring mounted on said rod between the arms of said yoke and engaging the heads on said sleeves, said tie rod being provided with stops at both sides of said yoke whereby said tie rod has a limited cushoined sidewise play relatively to said steering lever.

5. A vehicle of the character described comprising a framework, a pair of wheels, a rigid tie rod connecting said wheels, a yoke-like member slidably mounted on said rod, a steering lever pivotally mounted on said yoke, a pair of headed sleeves mounted on said rod and extending through said yoke with the heads thereof in engagement with the inner faces of the arms of said yoke, and a spring mounted on said rod between the arms of said yoke and engaging the heads on said sleeves, said tie rod having a pair of sleeves fixed thereon, one of said fixed sleeves acting as a fixed stop for one of said headed sleeves and the other of said fixed sleeves being threaded to be adjustably connected with a stop member for the other of said headed sleeves, whereby the tension of said spring may be adjusted.

In witness whereof, I hereunto subscribe my name this 12th day of June, A. D., 1919.

ALBERT P. LEE.